(No Model.)

H. OWSLEY.
METHOD OF MAKING STEEL WHEELS.

No. 285,763. Patented Sept. 25, 1883.

WITNESSES:
S. S. Schoff

INVENTOR
Heaton Owsley
BY James H. Coyne
ATTORNEY

UNITED STATES PATENT OFFICE.

HEATON OWSLEY, OF CHICAGO, ILLINOIS, ASSIGNOR TO THE ST. NICHOLAS TOY COMPANY, OF SAME PLACE.

METHOD OF MAKING STEEL WHEELS.

SPECIFICATION forming part of Letters Patent No. 285,763, dated September 25, 1883.

Application filed April 20, 1883. (No model.)

*To all whom it may concern:*

Be it known that I, HEATON OWSLEY, of Chicago, in the county of Cook and State of Illinois, have invented certain new and useful Improvements in Methods of Making Steel Wheels; and I do hereby declare that the following is a full, clear, and exact description of my invention, which will enable others skilled in the art to which it appertains to make and use the same, reference being had to the accompanying drawings, and to letters of reference marked thereon, which form a part of this specification.

Heretofore steel wheels have been made by swaging one end of the wire spoke and providing the other with a tightening device to regulate their tension; or they are made of V-spokes, both ends of which are secured in the rim. The use of tightening devices requires constant attention to preserve the tension of the spoke, and they are, moreover, an additional expense.

The object of my invention is to dispense with the use of tightening devices and to manufacture a wheel which, when the spokes are injured or broken, can be repaired without upsetting the same. This I accomplish by heading the hub end of the wire spoke, then slipping said spoke radially outward through a suitable aperture in the head portion of said hub until the head of the spoke bears against the annular surface of the same, and then adjusting the outer end of said spoke in a suitable aperture in the rim, swaging the same until the proper tension is obtained.

Figure 1:
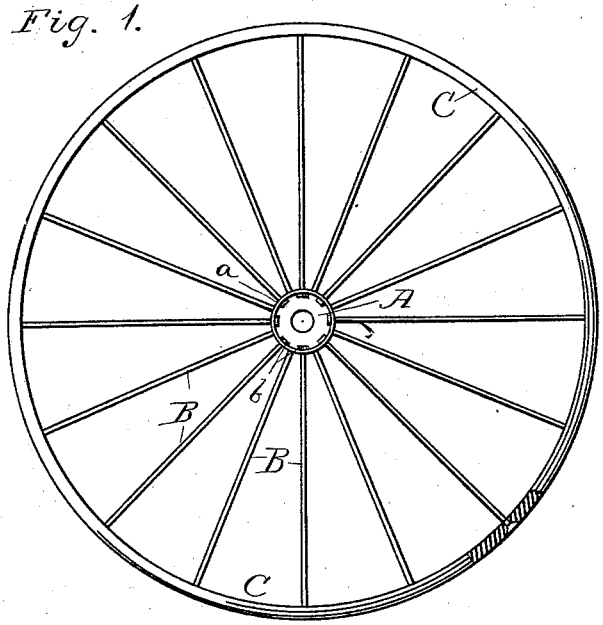
Figure 2:
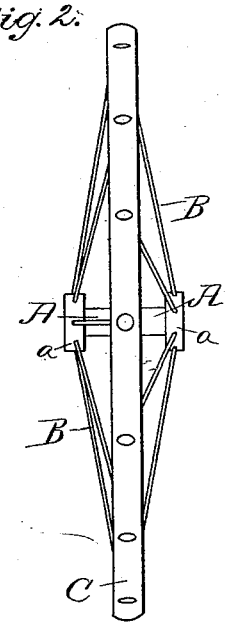
Figure 3:

In the drawings, Figure 1 is a side view of my improved wheel. Fig. 2 is an end view of the same, and Fig. 3 is a detail view.

In the drawings, A represents the hub of my improved wheel, having the heads $a$ $a$ at either end formed by increasing the diameter and providing an annular surface, as shown. B represents the spokes having a head, $b$; and C represents the rim or tire of the wheel.

When making my wheel I take the spokes and slip them radially outward through suitable apertures in the head $a$ of the hub until the head $b$ of the spoke bears against the annular surface of the same; then, putting the outer ends of the spokes through suitable corresponding holes in the rim C, I swage the ends thereof until the proper tension is obtained and until the wheel is perfectly round.

Various machines are used in the construction of my wheel—such, for instance, as a suitable vise for holding the spokes when being swaged, and machines for assisting in "truing" the wheel; but as these are used in the construction of most steel wheels no invention is claimed in their use. It is thus seen that the tension of the wire spokes is direct between the hub and tire of my wheel, and that no screw-thread or tightening devices are necessary.

I am aware of the existence of a steel wheel, which has continuous V-shaped spokes, the angle of which is secured in the hub, and the two ends of which are swaged in the rim; but in this the tension is not direct, or the whole wheel has to be "upset" when it is desired to replace an injured or broken spoke.

What I claim as new, and desire to secure by Letters Patent, is—

1. The method of constructing steel wheels wherein the tension of the spokes is directly between the hub and tire, by the formation of heads on the inner end of said spokes, the shoulders of which bear against the inner annular surface of the hub, and by the swaging of the outer ends of the spokes contiguous to the outer periphery of the tire into which said outer swaged end is preferably countersunk.

2. The method of obtaining the circularity of steel wheels, the inner ends of the spokes of which are secured in the hub by swaging the outer ends of said spokes contiguous to the outer periphery of the tire of said wheel.

In testimony that I claim the foregoing as my own I hereunto affix my signature in presence of two witnesses.

HEATON OWSLEY.

Witnesses:
JAMES H. COYNE,
FRANK D. THOMASON.